July 19, 1927.
A. E. F. MOONE
REEL FOR ELECTRIC CONDUCTORS
Filed Dec. 14, 1923
1,636,193
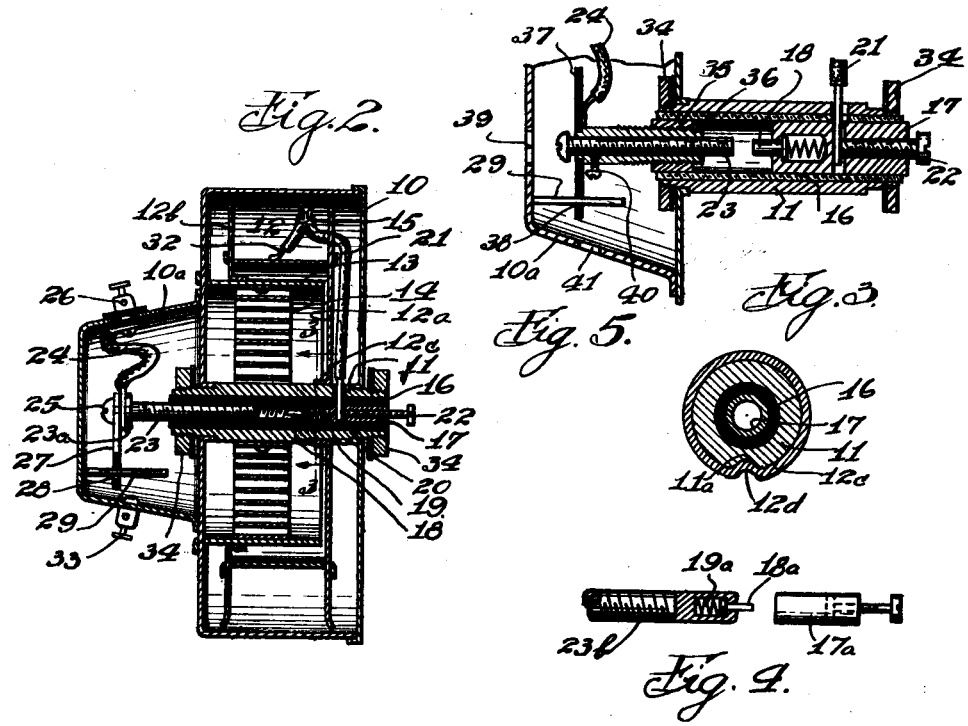
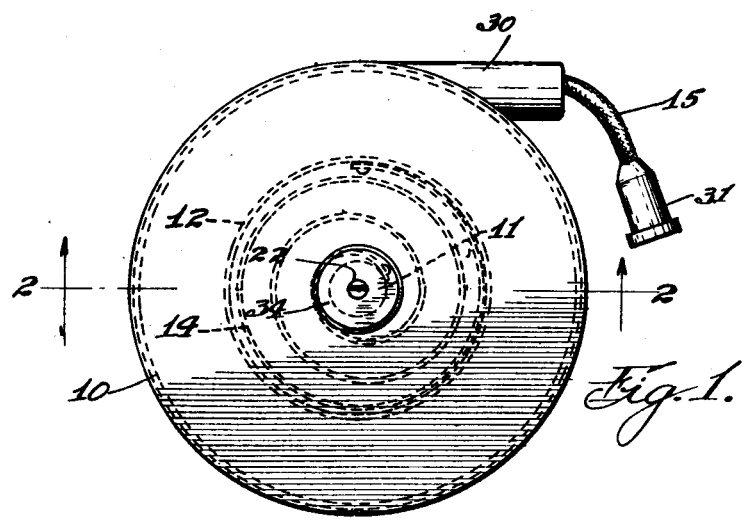
INVENTOR.
Albert E. F. Moone.
BY Albert C. Bell
ATTORNEY.

Patented July 19, 1927.

1,636,103

UNITED STATES PATENT OFFICE.

ALBERT E. F. MOONE, OF CHICAGO, ILLINOIS, ASSIGNOR OF ONE-THIRD TO J. M. COUGHLIN, OF CHICAGO, ILLINOIS.

REEL FOR ELECTRIC CONDUCTORS.

Application filed December 14, 1923. Serial No. 680,634.

My invention relates to an improved form of reel for electric conductors including switching mechanism actuated by rotation of the reel in winding the conductor on the reel and unwinding it therefrom, so that the circuit through the conductor supplying the device connected with the conductor with current, may be automatically closed or broken depending upon whether the conductor is drawn from the reel to use the said device, or wound on the reel by rotation thereof when the device is not in use. My invention relates particularly to the arrangement of said switching mechanism within the shaft of the reel, by which arrangement I secure a much simpler and more effective construction than is possible with devices heretofore proposed for this purpose.

By my invention I provide a pair of electric contacts in the shaft of the reel and insulated from each other, one of said contacts having threaded engagement with the shaft or a rotary part carried thereby, to engage the other of said contacts by its longitudinal motion and be disengaged therefrom as a result of rotation of the reel, depending upon the direction in which the reel is rotated. In carrying out my invention I prefer to provide one of the said contacts with a yielding element to maintain the contacts in engagement with each other during a predetermined amount of travel of the movable contact in an axial direction, corresponding with a desired amount of rotation of the reel and therefore a desired amount of electric conductor drawn from the reel. By my improved construction I also provide for moving one of said contacts relatively to the other of said contacts without rotation of the reel, for purposes of adjustment, whereby engagement and disengagement of the contacts may be effected for any desired position of the reel in its winding cycle, and therefore for any desired amount of conductor unwound from the reel or wound thereon.

While my improved reel construction is adapted particularly for use with cigar lighters, it will be understood that the reel construction is also adapted for use for any purpose for which it is desired to wind an electric conductor on a reel by rotation thereof under conditions making it advisable to interrupt the circuit through the conductor for the wound condition of the conductor on the reel and to close said circuit for a desired unwound condition of the conductor from the reel, without any act on the part of the user except drawing the conductor from the reel and winding it on the reel, or permitting it to be wound on the reel where the reel is spring actuated. My improved construction is adapted for controlling the flow of electric current through a heating element to be used as a cigar lighter, through an electric lamp, a soldering iron or any similar purpose.

My invention will best be understood by reference to the accompanying drawings showing a preferred embodiment thereof in which Fig. 1 shows the complete device in side elevation, Fig. 2 shows the complete device in central longitudinal sectional view, taken along the line 2—2 in Fig. 1.

Fig. 3 is a sectional view through the parts shown in Fig. 2, taken along the line 3—3.

Fig. 4 is a detail view showing a modified form of contact mechanism, and

Fig. 5 shows in a view similar to Fig. 2 to an enlarged scale, a form of adjustable contact mechanism.

Similar numerals refer to similar parts throughout the several views.

As shown in Fig. 2, a stationary support 10 has formed therein suitable bearings supporting a shaft 11 for rotary movement. While it is advisable that the support 10 should be in the form of an enclosing casing made preferably from sheet metal by stamping operations, it will be understood that the device is equally operative if the said support does not completely enclose the working parts, as long as it serves to maintain the parts of the device in proper relation to each other; also that the support may be made of any suitable material whether metal or otherwise and in any convenient manner or form to accomplish this result.

The shaft 11 has rigidly secured thereto, a reel 12 upon which the electric conductor is to be wound, said reel having one of its side walls $12^a$ extended to rigidly engage said shaft. As indicated in Fig. 3, the shaft is preferably provided with a keyway $11^a$ at this point, to receive a key or indentation $12^d$ extending inwardly from the supporting flange $12^c$ formed on the inner edge of the side wall 12ª. The support 10 has projecting therefrom inside of the winding surface of the reel, a cylindrical tubular member 13 to which one end of a spiral spring 14 is secured, the other end of said spring being secured to the shaft 11, as a result of which said spring tends to rotate said shaft and reel in a direction to wind the conductor 15 thereon.

As indicated in Fig. 2, the shaft 11 is tubular and carries in its bore a tube 16 of insulating material, for example fibre, hard rubber, bakelite or similar material which tightly engages the bore of the shaft to be carried thereby. The insulating tube 16 has mounted in one of its ends, a contact 17 comprising a metal body portion bored at its inner end to receive a contact making stud 18, which stud at its end within the body portion 17, is provided with an enlarged head engaging a spring 19 tending to hold the stud in its outermost position. The body portion 17 has formed transversely therethrough an aperture 20 in line with corresponding apertures through the shaft 11 and the insulating tube 16 to receive one of the wires 21 of the conductor 15, said wire 21 being rigidly clamped to the body portion of the contact 17 by means of a binding screw 22 threaded into the outer end of the contact 17.

The other end of the insulating tube 16 is internally threaded to engage corresponding threads on a second contact 23 which extends at its left hand end as shown in Fig. 2, beyond the said shaft and insulating tube and terminates in an enlarged head 23ª. A wire 24 is rigidly secured to the head 23ª by means of a clamping screw 25, the other end of said wire being connected with an insulated binding post 26 carried by an extension 10ª of the support 10. The screw 25 also rigidly secures to the contact 23 an arm 27 having an aperture 28 therethrough through which a rod 29 carried by the extension 10ª projects with a sliding fit and in a direction substantially parallel with the axis of the shaft 11. Electric contact between the contact 23 and the extension 10ª is prevented to maintain the wire 24 in insulated condition from the extension 10ª and support 10, for example, by forming the arm 27 and rod 29 of metal and bushing the aperture 28 with insulating material as indicated. This insulation of the wire 24 and contact 23 from the extension 10ª may be accomplished by constructing the arm 29 in any other desired manner and of any material that will prevent electric connection between said contact and said extension. As shown in Fig. 2 the extension 10ª is preferably in the form of a cap carried by the support 10 to enclose the parts described as cooperating with the contact 23, and the support 10 is preferably completely enclosed and said parts are preferably of sheet metal formed by stamping operations although they may be made in any desired manner and of any desired material suited to the purpose described. It will be observed that the screw 25 affords a means for securing the arm 27 to the contact 23 in any desired relation to secure operation of the contacts at any desired point in the cycle of operation of the reel.

The other side wall 12ᵇ of the reel 12 is continued inwardly to form a bearing support for the reel on the outer surface of the stationary tubular member 13 carried by the support 10, to relieve the connection between the side wall 12ª and the shaft 11 from undue strain, and said tubular member and the parts of the reel are preferably formed from sheet metal by stamping operations although they may be formed in any other desired manner and of any desired material that will accomplish the results described.

As indicated in Fig. 1 the support 10 carries at its outer edge a tubular guide 30 through which the conductor 15 extends from the reel 12 and to which the desired device, for example an electrically heated cigar lighter 31 is connected. As indicated in Fig. 2, the conductor 15 contains two insulated wires 21 and 32 to complete an electric circuit to the device 31 to be operated by current flow and the wire 32 at its other end may be electrically connected with the reel, for example by soldering. As shown in Fig. 2 the extension 10ª carries in electrical engagement therewith a binding post 33 constituting with the binding post 26, the electric terminals of the device.

The contact 23 is so proportioned, threaded and disposed relatively to the stud 18, that when the conductor 15 is wound by the spring 14 nearly or quite to its wholly wound condition, bringing the device 31 adjacent the end of the guide 30, electrical contact between the stud 18 and the contact 23 is interrupted, thus breaking electrical connection between the wire 24 and the wire 21 and opening the electric circuit through the device 31. When the conductor 15 is drawn from the reel, the threaded engagement between the contact 23 and the insulating tube 16 moves the contact 23 towards the stud 18 and into electrical contact therewith thus closing the circuit through the device 31, which operation may result from drawing any desired amount of the conductor 15 from the reel 12, after which continued rotation of the reel 12 by the drawing of the conductor 15 therefrom, moves the contact 23 towards the contact 17, sliding the stud 18 into the contact 17 against the action of the spring 19, thus maintaining the closure of the electric circuit through the device 31 for any amount of conductor drawn from the reel after the said contact is made at the desired point in the unwinding operation. The unwinding of the conductor 15 from the reel winds up the spring 14 around the shaft 11 in a manner such that when the pull on the conductor 15 is removed or reduced below the strength of the spring 14, said spring again winds the conductor on the reel and separates the contact 23 from engagement with the stud 18 when the desired amount of conductor has been wound on the reel.

The device may be supplied with electric current from any desired source not shown, depending upon the particular purpose for which the device is to be used. While in Fig. 2 I show the circuit of the device as completed from the wire 32 through the metal parts of the device to the binding post 33, it will be understood that this part of the circuit may be completed in any equivalent desired manner and that this feature of the construction does not constitute a part of my present invention and that as far as my present invention is concerned it is immaterial how this particular part of the circuit is completed.

In Fig. 4, I show a construction of contacts 17ª and 23ᵇ similar to the contacts above described and for the same purpose, and adapted to be used with the mechanism shown in Fig. 2 instead of the contacts 17 and 23, the only difference being that the contact 17ª is solid at its inner end portion and a sliding stud 18ª is mounted in the inner end of the contact 23ᵇ with a spring 19ª between its head and the contact 23ᵇ tending to maintain said stud in its outermost position for engagement with the end of the contact 17ª. The operation of this form of contact mechanism is the same as above described for the contact mechanism shown in Fig. 2.

In Fig. 5, I show a modified construction of contact mechanism by which the contacts may be adjusted to close and open the circuit through the conductors on the reel for any desired amount of conductor wound on the reel, after the device is assembled. In this construction the shaft 11 has secured therein a tube 16 of insulating material, for example fibre, in the right hand end of which as shown in this figure, a metal contact 17 is secured carrying a contact stud 18 in substantially the manner described above in connection with Fig. 2. The contact 17 is also provided with a clamping screw 22 for engaging the wire 21 in the manner shown in Fig. 2. In the construction of Fig. 5, the other end of the tube 16 has secured therein a metal sleeve 35 having inner threads engaging an externally threaded metal sleeve 36 contained in said sleeve 35. The sleeve 36 is internally threaded to engage the threads of the screw 23, supported by the sleeve 36 to engage the contact 18 in the manner described above in connection with the construction shown in Fig. 2. The sleeve 36 carries at its outer end a disc 37 of insulating material, for example fibre, which is rigidly secured to said sleeve in any desired manner, said disc being provided with an aperture 38 to receive a rod 29 carried by the extension 10ª of the support or casing. The extension 10ª has formed therethrough in line with the screw 23 an aperture 39 permitting access by means of a screw driver to the head of the screw 23, so that said screw may be adjusted as desired in the bushing 36. The sleeve 36 carries a set screw 40 adjacent the disc 37 for locking the screw 23 in any desired adjustment and the extension 10ª is provided with an aperture 41 in line with said set screw 40 to permit loosening and tightening it by means of a suitable screw driver in adjusting the screw 23.

As a result of this construction the sleeve 36, disc 37 and rod 29 cooperate to move the screw 23 into and from engagement with the contact 18 in substantially the same manner that the screw 23 and contact 18 are operated with the construction shown in Fig. 2. The screw 23 being adjustable longitudinally in the sleeve 36, provision is made with this construction for bringing the screw 23 and contact 18 into engagement and also disengaging said parts from each other for any desired amount of conductor wound on the reel carried by the shaft 11. The wire 24 is connected in any suitable manner with the sleeve 36. In other respects than shown in Fig. 5, the construction may be substantially the same as above described in connection with Fig. 2.

From the above it will appear that by my construction the contact mechanism is of simple form and is mounted in such a manner that it cannot be accidentally injured as it is wholly enclosed within the shaft itself; also that the parts outside of the shaft employed to control the movable contact are of simple construction, readily assembled and of a nature not apt to get out of order. Furthermore the movable contact may readily be given any desired adjustment relatively to its controlling arm and in this way any desired adjustment of the contacts may readily be effected and furthermore this adjustment may be made with any desired degree of accuracy.

While I have shown my invention in the particular embodiment above described, it will be understood that I do not limit myself to this exact construction as I may employ equivalents known to the art at the time of the filing of this application without departing from the scope of the appended claims.

What I claim is:

1. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, and devices between said first contact and said support preventing rotary movement of said first contact.

2. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, and devices between said first contact and said support preventing rotary movement of said first contact, one of said contacts having a yielding element for engaging the other of said contacts.

3. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, and devices between said first contact and said support preventing rotary movement of said first contact, the second one of said contacts having a yielding element for engaging the first one of said contacts.

4. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, devices between said first contact and said support preventing rotary movement of said first contact, and connecting means carried by said contacts for engaging conductors included in the circuit controlled by said contacts.

5. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, devices between said first contact and said support preventing rotary movement of said first contact, and connecting means carried by said second contact for engaging a conductor to be carried by said reel.

6. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, devices between said first contact and said support preventing rotary movement of said first contact, an insulated binding post carried by said support, connecting means carried by said first contact, and a conductor extending from said connecting means to said binding post.

7. In a reel for electric conductors, the combination of a support, a shaft mounted for rotary movement in said support, a reel carried by said shaft, two electric contacts carried by and insulated from said shaft, a first one of said contacts having threaded engagement with said shaft to be engaged by and disengaged from the second one of said contacts by motion of said first contact longitudinally of said shaft, and devices between said first contact and said support preventing rotary movement of said first contact, said devices including elements movable relatively to each other for adjustment and other elements for locking said movable elements in desired adjustment.

8. In a reel for electric conductors, the combination of a support, a reel mounted for rotary movement relatively to said support, and electric contacts operated by said relative movement, said contacts being manually movable relatively to each other independently of relative movement between said reel and said support for adjusting purposes.

9. In a reel for electric conductors, the combination of a support, a reel mounted for rotary movement relatively to said support, electric contacts operated by said relative movement, said contacts being manually movable relatively to each other independently of relative movement between said reel and said support for adjusting purposes, and locking means for retaining said contacts in any desired adjustment.

10. In a reel for electric conductors, the combination of a housing, a rotary shaft carried by said housing, a reel rigidly mounted on said shaft for movement therewith, a projecting member extending from said housing within said reel in spaced relation with said shaft, a winding spring between said shaft and said member and secured thereto, and electric contacts actuated by rotation of said shaft.

11. In a reel for electric conductors, the combination of a housing, a rotary shaft carried by said housing, a reel rigidly mounted on said shaft for movement therewith, a projecting member extending from said housing within said reel in spaced relation with said shaft, a winding spring between said shaft and said member and secured thereto, said shaft being hollow, a first insulated contact in said shaft and engaging threads carried thereby, a second insulated contact in said shaft and secured thereto for engagement by said first contact, and devices between said first contact and said housing preventing rotation of said first contact.

12. In a reel for electric conductors, the combination of a housing, a rotary shaft carried by said housing, a reel rigidly mounted on said shaft for movement therewith, a projecting member extending from said housing within said reel in spaced relation with said shaft, a winding spring between said shaft and said member and secured thereto, said shaft being hollow, a first insulated contact in said shaft and engaging threads carried thereby, a second insulated contact in said shaft and secured thereto for engagement by said first contact, and devices between said first contact and said housing preventing rotation of said first contact, one of said contacts having a yielding element for engaging the other of said contacts.

13. In a reel for electric conductors, the combination of a housing, a rotary shaft carried by said housing, a reel rigidly mounted on said shaft for movement therewith, a projecting member extending from said housing within said reel in spaced relation with said shaft, a winding spring between said shaft and said member and secured thereto, said shaft being hollow, a first insulated contact in said shaft and engaging threads carried thereby, a second insulated contact in said shaft and secured thereto for engagement by said first contact, and devices between said first contact and said housing preventing rotation of said first contact, the second one of said contacts having a yielding element for engaging the first one of said contacts.

14. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact.

15. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, one of said contacts having a yielding element for engaging the other of said contacts.

16. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, the second one of said contacts having a yielding element for engaging the first one of said contacts.

17. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, said first contact comprising a bushing having external threads engaging threads carried by said shaft, a contact member movable longitudinally in said bushing, and means holding said contact member in desired adjustment in said bushing.

18. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, said first contact comprising a bushing having external threads engaging threads carried by said shaft, a contact member movable longitudinally in said bushing, and means holding said contact member in desired adjustment in said bushing, said housing having apertures therethrough permitting access to said contact member and holding means.

19. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, said first contact comprising a bushing having external threads carried by said shaft, a screw contact member engaging internal threads in said bushing, and a set screw in said bushing engaging said screw contact member.

20. In a reel for electric conductors, the combination of a casing, a hollow shaft mounted for rotary movement in said casing, a reel carried by said shaft, a first electric contact carried in said shaft engaging screw threads carried thereby, a second electric contact carried in said shaft in fixed relation thereto for engagement by said first contact, said contacts being insulated from each other, and devices between said first contact and said casing preventing rotation of said first contact, said first contact comprising a bushing having external threads carried by said shaft, a screw contact member engaging internal threads in said bushing, and a set screw in said bushing engaging said screw contact member, said housing being perforated to permit access to said screw contact member and said set screw.

In witness whereof, I hereunto subscribe my name this 11th day of December, A. D. 1923.

ALBERT E. F. MOONE.